Apr. 24, 1923. 1,453,214
G. VEGLIO
SAFETY SUPPORT FOR THE SPARE WHEELS OF AUTOMOBILES
Filed July 7, 1920
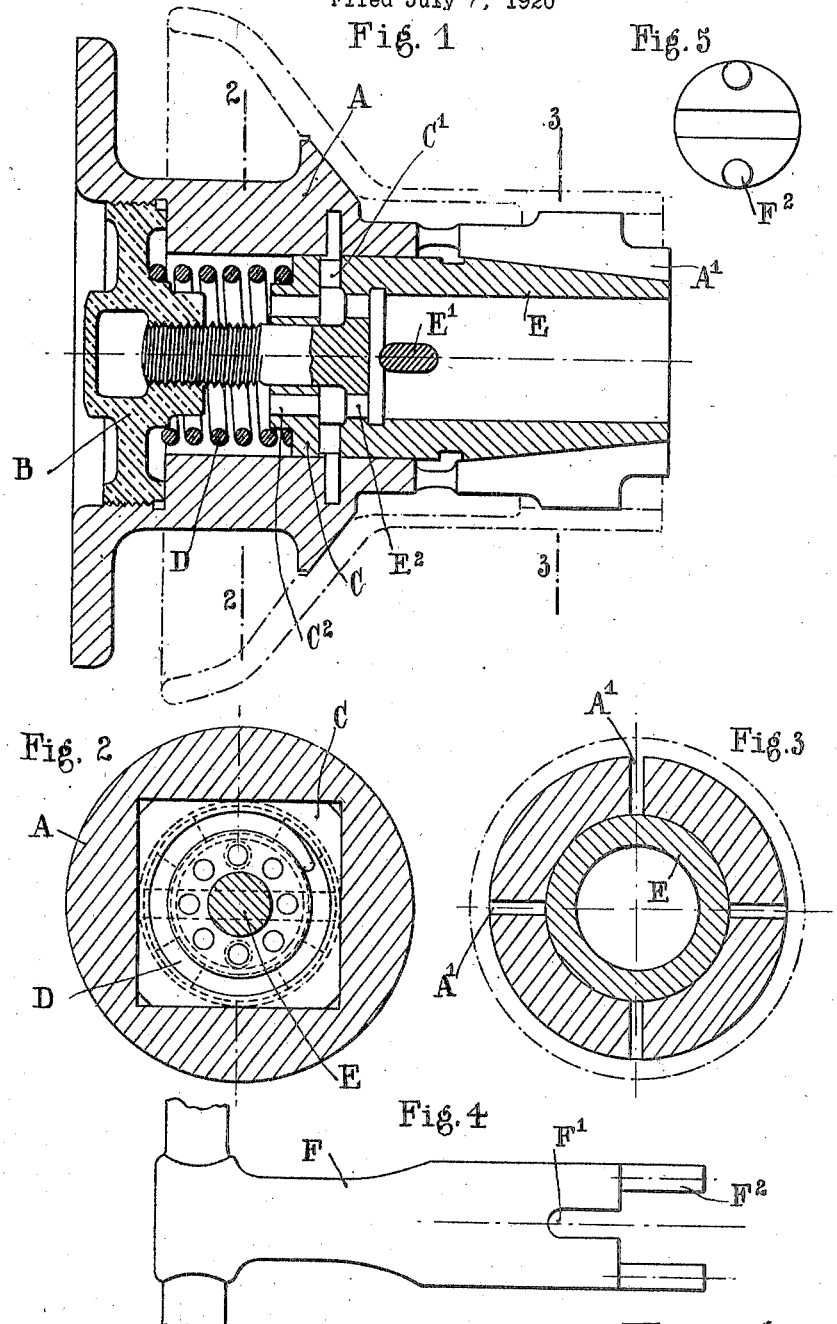

Patented Apr. 24, 1923.

1,453,214

UNITED STATES PATENT OFFICE.

GAETANO VEGLIO, OF LEVALLOIS-PERRET, FRANCE.

SAFETY SUPPORT FOR THE SPARE WHEELS OF AUTOMOBILES.

Application filed July 7, 1920. Serial No. 394,479.

*To all whom it may concern:*

Be it known that I, GAETANO VEGLIO, a subject of the King of Italy, residing at Levallois-Perret, Seine, France, have invented new and useful Improvements in Safety Supports for the Spare Wheels of Automobiles, of which the following is a specification.

The present invention relates to a safety support for the spare-wheels of automobiles.

Figure 1 is a longitudinal section of the support;

Figure 2 is a transverse section showing the safety device;

Figure 3 is a transverse section of the extensible hub;

Figure 4 shows the operating key;

Figure 5 is an end view of said key.

The support shown in Figures 1 to 3 consists of an expansible hub which clamps the wheel under the action of a locking cone.

The whole device consists of a hub A, a rear nut B screwed into the hub A, a safety sliding-member C having a number of claws or clutch teeth, a spring D, a clamping cone E and an operating key F.

The hub A upon which the wheel is centred is split in several places $A^1$ for a length sufficient for clamping the wheel firmly on the hub.

It bears internally the seat for the cone E, the square seat for the safety sliding member or abutment C of the spring D and a screwed portion adapted to receive the rear nut B. The rear nut B is fixed by its outer threaded portion to the left of the hub and its central portion is tapped to permit the cone to screw in towards the left.

The safety sliding member C having a plurality of claws is square externally so as to fit into the hub A. At its front end it carries claws $C^1$ which co-operate with the same number of claws to prevent the cone from slacking back, in such a manner that two holes $C^2$ are always opposite the two holes $E^2$ of the cone, the holes of the sliding member $C^2$ being smaller than the holes $E^2$ of the cone, any false key having pins of smaller diameter than that of the holes $C^2$ could not oscillate the safety sliding member; the pins of the key would pass through and would not slacken the cone. At its centre the sliding member has a bore for the passage of the stem of the cone.

The clamping cone E consists of the cone proper, the claws or clutch teeth of which are engaged with the sliding member C, the screwed end which screws into the nut B, a bar $E^1$ fixed to the cone E, a key F having pins $F^2$ adapted to pass through holes $E^2$ in the cone for enabling the safety member to be moved back.

The key F consists of a T-shaped portion terminating in a slot for operating the bar $E^1$ on the cone, in addition to the pins $F^2$ for unlocking the safety sliding member C.

Method of operation: The device is mounted and the locking cone E slacked back.

The wheel to be secured is placed upon the hub. The key F is introduced into the cone and by acting thereon the claws of the sliding member are disengaged from those carried by the cone. It is then sufficient to turn so as to effect clamping by elastic deformation of the hub A.

When this is effected, the key F is withdrawn from its seat and automatically, under the action of the spring D, the claws of the safety sliding member C lock the clamping cone E.

Unlocking can only be effected by the aid of the key and by unscrewing the cone.

It will be understood that the description given above is given by way of example and may vary in practical details.

I claim:

1. A support for securing spare wheels for automobiles, comprising an expansible hub, adapted to receive the spare wheel, a cone located within said hub, said cone terminating in a screwed portion, a nut fixed to said hub and receiving said screwed portion, means for rotating said cone and means for locking said cone.

2. A support for securing spare wheels for automobiles comprising an expansible hub adapted to receive the spare wheel, a cone located within said hub and adapted to expand it, a screwed portion terminating said cone, a nut fixed to said hub and receiving said screwed portion, a sliding member fitted within said hub between the nut and the cone, said sliding member having claws adapted to engage with similar claws on the cone.

3. A support for securing spare wheels for automobiles comprising an expansible hub adapted to receive the spare wheel, a cone located within said hub and adapted to expand it, a screwed portion terminating said cone, a nut fixed to said hub and receiving said screwed portion, a sliding member fitted within said hub between the nut and the cone, said sliding member having claws adapted to engage with similar claws on the cone and a spring between said nut and the sliding member.

4. A support for securing spare-wheels for automobiles comprising an expansible hub adapted to receive the spare wheel, a cone located within said hub and adapted to expand it, a bar passing through said cone and fixed thereto, a screwed portion terminating said cone, a nut fixed to said hub and receiving said screwed portion, a sliding member fitted within said hub between the nut and the cone, said sliding member having claws adapted to engage with similar claws on the cone and a spring between said nut and the sliding member.

5. A support for securing spare wheels for automobiles comprising an expansible hub adapted to receive the spare wheel, a cone located within said hub and adapted to expand it, a bar passing through said cone and fixed thereto, a screwed portion terminating said cone, a nut fixed to said hub and receiving said screwed portion, a sliding member fitted within said hub between the nut and the cone, said sliding member having claws adapted to engage with similar claws on the cone, a spring between said nut and the sliding member and a key adapted to disengage said claws and to rotate the cone.

6. A support for securing spare wheels to motor vehicles, comprising an expansible hub adapted to receive the spare wheel, a cone located within said hub and adapted to expand it, a bar passing through said cone and fixed thereto, a screw-threaded portion terminating said cone, a nut fixed to said hub and receiving said threaded portion, a sliding member fitted within said hub between the nut and the cone, said sliding member having claws adapted to engage with similar claws on the cone, a spring between said nut and the sliding member, a key adapted to disengage said claws and to rotate the cone, said key having pins adapted to pass through holes in the cone but too large to enter registering holes in the sliding member.

GAETANO VEGLIO.